(12) United States Patent
Ogawa et al.

(10) Patent No.: US 6,767,503 B2
(45) Date of Patent: Jul. 27, 2004

(54) METHOD OF PRODUCING CERAMIC

(75) Inventors: Hirozumi Ogawa, Shiga-ken (JP);
Masahiko Kimura, Kusatsu (JP);
Akira Ando, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 7 days.

(21) Appl. No.: 10/141,363

(22) Filed: May 7, 2002

(65) Prior Publication Data
US 2002/0195750 A1 Dec. 26, 2002

(30) Foreign Application Priority Data
May 8, 2001 (JP) ........................................ 2001-137474
Mar. 25, 2002 (JP) ........................................ 2002-084524

(51) Int. Cl.$^7$ ............................................. B28B 3/800
(52) U.S. Cl. ........................................ 264/650; 264/667
(58) Field of Search ................................ 264/650, 667; 505/430

(56) References Cited

U.S. PATENT DOCUMENTS 5,902,542 A * 5/1999 Hirao et al. ................. 264/639
6,042,667 A * 3/2000 Adachi et al. ........... 156/89.12
6,199,404 B1 * 3/2001 Kawai et al. ................. 65/102

* cited by examiner

Primary Examiner—Christopher A. Fiorilla
(74) Attorney, Agent, or Firm—Dickstein, Shapiro, Morin & Oshinsky, LLP.

(57) ABSTRACT

A ceramic powder of grains having a shape-anisotropy is mixed with a calcined or uncalcined (or both) powder of a ceramic raw material. A ceramic slurry containing the produced mixed powder, a solvent and a binder is prepared and the ceramic slurry is formed into a sheet. A laminate comprised of a plurality of the sheets laminated to each other is uniaxially pressed to form an oriented product in such a manner that the length of the laminate in the direction parallel to the pressing axis becomes larger than that before the pressing, and the area of a plane perpendicular to the pressing axis of the laminate becomes larger than that before the pressing. The oriented formed product is fired and sintered.

10 Claims, 3 Drawing Sheets

METHOD OF PRODUCING CERAMIC

BACKGROUND OF THE INVENTION

1. Field of the Invention

The present invention relates to a method of producing a ceramic and, more particularly, to a method of producing an oriented ceramic which can be especially used as an electronic material such as a piezoelectric material or the like.

2. Description of the Related Art

According to one method of producing ceramics in the field of the present invention, ceramic green sheets are laminated, press bonded to each other and fired. The ceramic green sheets are pressed in this method in such a manner that the area of the respective ceramic green sheets in the direction perpendicular to the pressing axis is prevented from increasing. The crystal grains of the ceramic obtained by this method are not oriented.

On the other hand, it is known that oriented ceramics in which the crystal grains are oriented are especially useful as electronic materials such as piezoelectric materials or the like. For example, as described in the report by T. Takenaka, et al., the orientation of a layered perovskite compound ceramic such as $Na_{0.5}Bi_{4.5}Ti_4O_{15}$ or the like as a piezoelectric material caused the electromechanical coupling coefficient for the thickness longitudinal fundamental vibration of a columnar vibrator to increase to about 2.2 times of that of the ordinary not-oriented ceramic (Sensor and Materials. Vol. 1, 35 (1988)). S. Jin et al reported that as a superconductor material, an oriented $YBa_2Cu_3O_7$-δ ceramic was prepared, and the critical current density thereof was increased to about 12 times of that of the non-oriented ceramic (Physical Review B, vol. 37, No. 13, 7850 (1988)). It will be appreciated that orientation means the state of crystal grains having a large shape-anisotropy in which the directions of the grains are the same as a whole.

As methods of producing oriented ceramics, hot forging, Templated Grain Growth (TGG), and so forth have been employed.

Oriented ceramics having high orientation degrees can be obtained by the hot forging method. T. Takenaka et al produced an oriented ceramic of $Na_{0.5}Bi_{4.5}Ti_4O_{15}$ by the hot forging method. According to this method, a formed product is heat-treated (fired) while it is pressed. The orientation degree of the produced oriented ceramic, measured by the Lotgering method, was 98%. However, the hot forging method needs to employ a special heat-treatment apparatus suitable for press-firing and, moreover, is a batch-process heat-treatment. Thus, this method is expensive and unsuitable for mass production.

Seong-Hyon Hong et al produced an oriented ceramic of $Bi_4(Ti_{3.06}Nb_{0.04})O_{12}$ by the TGG method. Here, the ceramic crystal grains having a shape-anisotropy are mixed prior to forming. The orientation degree of the oriented ceramic obtained by this method, measured by the Lotgering method, was 96%, and the piezoelectric constant d33 thereof was enhanced to about 1.5 times of that of the non-oriented ceramic (J. Am. Ceram. Soc., vol. 83, 113 (2000)). It is unnecessary to press-fire by a batch-process according to the TGG method, and therefore, this method is suitable for mass production. However, the orientation degree of the crystal grains of a ceramic produced by the TGG method is low compared to that by the hot forging method.

To enhance the characteristics of a ceramic such as an electromechanical coupling coefficient by orienting the ceramic, it is necessary to realize a still higher orientation degree. In general, it is more difficult to produce highly-oriented ceramics by the TGG method compared to the production by the hot forging method.

The inventors compared a non-oriented ceramic prepared by press-bonding a laminate and then firing with the hot forging and TGG methods using $CaBi_4Ti_4O_{15}$+0.5% by weight $MnCO_3$. Table 1 shows the comparison results.

TABLE 1

|  | Press-bonded laminate is fired | Hot forging | TGG* |
|---|---|---|---|
| Orientation degree | 0% | 98% | 91% |
| Electromechanical coupling coefficient at thickness shearing vibration | 15% | 35.1% | 30.5% |

*pressing thickness reduction ratio is 1.

As seen in Table 1, the crystal grains of the ceramics produced by the hot forging and TGG methods are oriented in contrast to the ceramic produced by the prior art method of firing a press-bonded laminate. The orientation degree of the ceramic or produced by the TGG method is lower, and also, the enhancement of the characteristic is smaller, compared to those by the hot forging method.

SUMMARY OF THE INVENTION

Accordingly, it is a main object of the present invention to provide a method of producing a ceramic by which an ordinary baking furnace can be used for firing, and in the case of the same materials being used, an oriented ceramic having an orientation degree higher than that made by the TGG method can be produced.

It is another object of the present invention to provide a method of producing a ceramic by which an ordinary baking furnace can be used for firing, and in the case of the same materials being used, an oriented ceramic having an orientation degree higher than that by the TGG method and substantially equal to that by the hot forging method can be produced.

It is still another object of the present invention to provide a method of producing a ceramic by which an ordinary baking furnace can be used for firing, and in the case of the same materials being used, an oriented ceramic which has a higher orientation degree and a higher sintering density than those by the TGG method can be produced.

Specifically, the present invention provides a method of producing a ceramic comprising the steps: preparing ceramic slurry containing a powder of ceramic crystal grains having a shape-isotropy mixed with a powder of a ceramic raw material or a calcined powder of a ceramic raw material, or both; forming the ceramic slurry to produce a formed product; uniaxially pressing the formed product so that the length of the formed product in the direction parallel to the pressing axis is decreased compared to that before the pressing, and the area of a plane perpendicular to the pressing axis of the formed product is increased compared to that before the pressing, whereby an oriented formed product is produced; and firing the oriented formed product to sinter it.

Preferably, the length of the oriented formed product in the direction parallel to the pressing axis is up to about half of the length of the formed product before pressing.

Also, preferably, the amount of the ceramic crystal grains having a shape-anisotropy is in the range of about 25 to 52% by weight based on 100% by weight of the mixed powder.

Furthermore, preferably, the ceramic crystal grains having a shape-anisotropy are flat, and the aspect ratio is in the range of about 5 to 10. The aspect ratio is the ratio of the maximum size of a ceramic crystal grain to the height thereof.

Preferably, the ceramic crystal grains having a shape-anisotropy have a layered perovskite crystal structure.

According to the method of producing a ceramic of the present invention, an ordinary baking furnace can be used for firing. When the same materials are used, an oriented ceramic having a higher orientation degree than that by the TGG method can be obtained. Therefore, the production cost of the ceramic can be reduced, and also, a ceramic having a higher orientation degree compared to that by the TGG method can be produced.

When the length of the oriented formed product in the direction parallel to the pressing axis is up to about half of the length of the formed product before pressing, a ceramic having a still higher orientation degree, e.g., an orientation degree substantially equal to that by the hot forging method, can be produced.

Moreover, when the amount of the ceramic crystal grains having a shape-anisotropy is in the range of about 25 to 52% by weight based on 100% by weight of the mixed powder, a ceramic having a high orientation degree and a high sintering density can be obtained.

Also, when the ceramic crystal grains having a shape-anisotropy are flat, and the aspect ratio (ratio of the maximum size thereof to the height) is in the range of about 5 to 10, a ceramic having a high orientation degree can be obtained. If the aspect ratio is higher than about 10, the density of the ceramic becomes low.

Moreover, when the ceramic crystal grains having a shape-anisotropy have a layered perovskite crystal structure, an oriented ceramic having a remarkably higher orientation degree and a superior piezoelectric characteristic can be produced. Examples of the material having the layered perovskite crystal structure includes $BiWO_6$, $CaBi_2Nb_2O_9$, $SrBi_2Nb_2O_9$, $BaBi_2Nb_2O_9$, $P_bBi_2Nb_2O_9$, $CaBi_2Ta_2O_9$, $SrBi_2Ta_2O_9$, $BaBi_2Ta_2O_9$, $PbBi_2Ta_2O_9$, $Bi_3TiNbO_9$, $Bi_3TiTaO_9$, $Bi_4Ti_3O_{12}$, $SrBi_3Ti_2NbO_{12}$, $BaBi_2Ti_2NbO_{12}$, $PbBi_3Ti_2NbO_{12}$, $CaBi_4Ti_4O_{15}$, $SrBi_4Ti_4O_{15}$, $BaBi_4Ti_4O_{15}$, $PbBi_4Ti_4O_{15}$, $Na_{0.5}Bi_{4.5}Ti_4O_{15}$, $K_{0.5}Bi_{4.5}Ti_4O_{16}$, $Ca_2Bi_4Ti_5O_{18}$, $Sr_2Bi_4Ti_5O_{18}$, $Ba_2Bi_4Ti_5O_{18}$, $Pb_2Bi_4Ti_5O_{18}$, $BiTiWO_{18}$, $Bi_7Ti_4NbO_{21}$, $Bi_{10}Ti_2W_3O_{30}$, and combinations of at least two of these materials.

The above-mentioned objects of the present invention, and also the characteristics and the advantages thereof will be clarified in the detailed description of the preferred modes of carrying out the invention and the examples of the invention, which is made hereinunder with reference to the drawings attached thereto.

DESCRIPTION OF THE PREFERRED EMBODIMENTS

Example

As starting materials, $Bi_2O_3$, $TiO_2$, $CaCO_3$ and $MnCO_3$ were prepared. These materials were weighed out so that a composition of $CaBi_4Ti_4O_{15}$+0.5% by weight of $MnCO_3$, can be produced, and wet-mixed for about 16 hours by means of a ball mill. The obtained mixture was dried and calcined at 900° C. for 2 hours to obtain calcined powder of the ceramic materials.

A portion of the calcined powder and NaCl were mixed at a mixing weight ratio of 1:1, and heat-treated (fired) at a temperature of 950 to 1050° C. for 10 hours. The NaCl was removed from the fired product to obtain a ceramic powder of $CaBi_4Ti_4O_{15}$. Scanning electron microscopy of the powder showed that it was anisotropic in shape and had a sheet-like shape. Moreover, the aspect ratio of the sheet-shaped ceramic powder, that is, the ratio of the height to the maximum size was about 10.

A mixed powder comprising 50 parts by weight of the sheet-shaped ceramic powder and 50 parts by weight of the above-described calcined powder, an organic binder, a dispersant, an antifoaming agent and a surfactant were mixed to obtain ceramic slurry. The ceramic slurry was formed by a doctor blade method into sheets as formed products. The thickness of the sheets were in the range of 40 to 100 $\mu$m. The sheets were overlaid so that the total thicknesses of the resulting laminates were 1.25 mm, 1.7 mm, 2 mm and 3.3 mm. The sheets were then uniaxially pressed to be securely fixed to each other. Thus, oriented formed products as samples were obtained.

Figure 1:
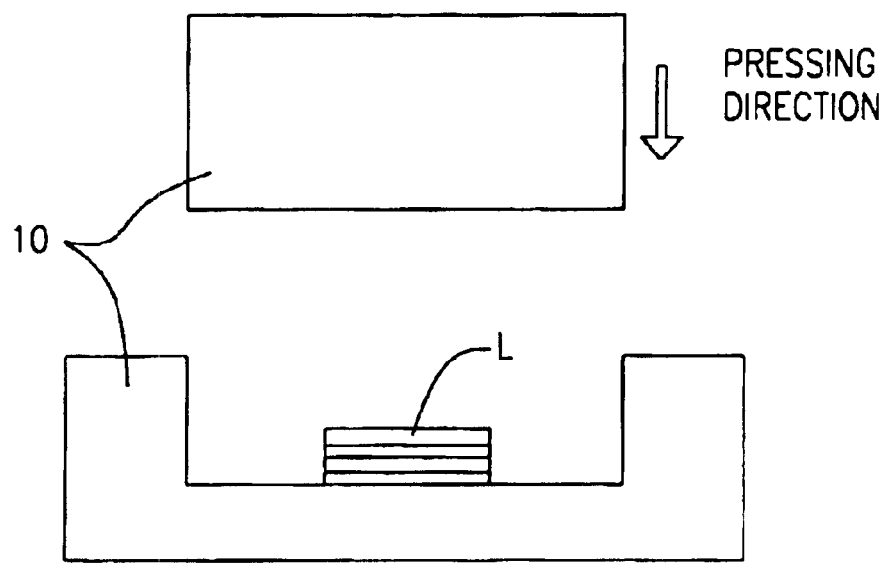
FIG. 1 illustrates a step contained in an example of the method for producing a ceramic according to the present invention.

Especially referring to the uniaxially pressing, each laminate L comprising the overlaid sheets was placed into a metallic mold 10 and then pressed, as shown in FIG. 1. In this case, the size of the metallic mould 10 was adjusted so that the press thickness-reduction ratios of the laminates L having thicknesses of 1.25 mm, 1.7 mm, 2 mm and 3.3 mm were 0.8, 0.6, 0.5 and 0.3, respectively, and the thicknesses after the press-bonding of the laminates L were about 1 mm. The press thickness reduction ratio is defined by the following formula $$\text{press thickness reduction ratio} = H_1/H_0$$

in which $H_0$ represents the thickness of the laminate comprising overlaid sheets before pressing, and $H_1$ is the thickness of the laminate after the pressing.

Figure 2:
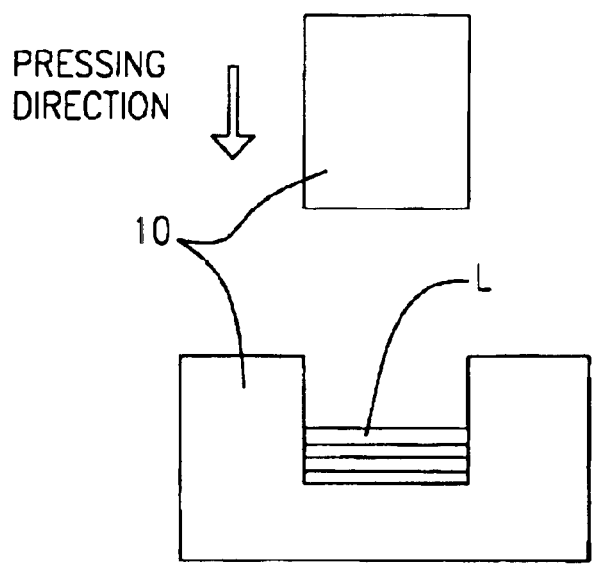
FIG. 2 illustrates a step contained in an example of the method for producing a ceramic of the prior art.

For comparison, a sample was prepared by a TGG method. That is, a metallic mold 1 having a size equal to the sheets was used as shown in FIG. 2. The laminate L comprising the sheets overlaid on each other as described above was placed in the mold, and pressed so that the length of the laminate L in the direction parallel to the pressing axis and the area of the plane of the laminate L perpendicular to the pressing direction after the pressing were not changed from those before the pressing. In other words, the sheets were securely bonded to each other so as to have a press thickness-reduction ratio of 1.0.

Thereafter, the respective samples were heat-treated (fired) at 1150° C. for 2 hours to be sintered. The orientation degree at the surface of each sample was measured by the Lotgering method. The Lotgering method is one of the techniques for measuring the orientation of a sample. That is, a ratio $P_0$ is determined as follows:

ratio $P_0 = \{\Sigma I(001)/\Sigma I(hk1)\}$ in which $\Sigma I(hk1)$ represents the sum of the reflection intensities $I(hk1)$ at the respective crystal planes $(hk1)$ of a non-oriented sample, and $\Sigma I(001)$ represents the sum of the reflection intensities $I(001)$ at the $(001)$ planes. A ratio P for an oriented sample is determined in a similar manner:

$P = \{\Sigma I(001)/\Sigma I(hk1)\}$

The orientation degree F. is then determined using $P_0$ and P as follows.

$F(\%) = \{(P-P_0)/(1-P_0)\} \times 100$

For comparison, samples having the same composition as those of the above-described Example were prepared by a hot forging method. In the hot forging method, a uniaxial pressing force is applied to a sample while it is being fired. In this case, the same calcined powder as that of the above-described Example was mixed with an organic binder. The sample was press-formed into a columnar shape with a diameter of 17 mm and a height of 8 mm. The sample was heat-treated (fired) at 1150° C. for 2 hours. In this heat-treatment, the sample was uniaxially pressed at a total pressure of about 500 kg.

Table 2 shows the relationship between the pressing thickness reduction ratios of the samples prepared as described above and the orientation degrees thereof. The orientation degree of the sample prepared by the hot forging method was 98%.

TABLE 2

| pressing thickness-reduction ratio | Orientation degree (%) |
|---|---|
| 1.0* | 91 |
| 0.8 | 95 |
| 0.6 | 96 |
| 0.5 | 98 |
| 0.3 | 98 |

*The sample is not made according to the present invention.

As shown in Table 2, the orientation degrees of all the samples according to the present invention were at least 95%.

The sample prepared according to the TGG method pressed in such a manner that the length thereof in the direction parallel to the pressing axis and the area of the surface thereof perpendicular to the pressing direction after pressing were not changed from those before the pressing, that is, at a pressing thickness reduction of 1.0, had an orientation degree of 91%.

As seen in Table 2, the oriented ceramic samples according to the present invention and prepared at a pressing thickness reduction ratio of up to about 0.5, that is, prepared in such a manner that the length of an oriented formed-product in the direction parallel to the pressing axis was up to about half of that of the product to be formed, had orientation degrees that were almost equal to those of the oriented ceramic samples obtained by the hot forging method.

For reference, Table 3 shows the relation between the orientation degrees of the oriented ceramic of $CaBi_4Ti_4O_{15}$ and the electromechanical coefficients at thickness shear mode vibration.

TABLE 3

| orientation degree (%) | electromechanical coupling coefficient (%) at thickness shear mode vibration |
|---|---|
| 91 | 30.5 |
| 93 | 31.1 |
| 95 | 31.9 |
| 96 | 32.7 |
| 98 | 33.8 |

As apparently seen in Table 3, the electromechanical coupling coefficient caused at thickness shear vibration was larger as the orientation degree of the oriented ceramic of $CaBi_4Ti_4O_{15}$ was higher.

In other samples of the above-described Example, the content of the sheet-shaped ceramic powder were set at 10% by weight, 25% by weight, 45% by weight, 50% by weight, 52% by weight and 60% by weight. The orientation degrees and the densities of these samples were measured. In this case, the aspect ratio of the sheet-shaped ceramic powder was 10, and the pressing thickness reduction ratio of the samples was 0.5. Table 4 shows the results.

TABLE 4

| content of sheet-shaped ceramic powder (% by weight) | orientation degree (%) | Density (g/cm³) |
|---|---|---|
| 10 | 60 | 6.9 |
| 25 | 85 | 7.1 |
| 45 | 95 | 7.2 |
| 50 | 98 | 7.2 |
| 52 | 98 | 7.15 |
| 60 | 98 | 6.7 |

Similarly, samples were prepared by the TGG method in the same manner as that of the samples of Table 4 except that the pressing thickness reduction ratio was 1.0, and the orientation degrees and the densities were measured. Table 5 shows the results.

TABLE 5

| content of sheet-shaped ceramic powder (% by weight) | Orientation degree (%) | density (g/cm³) |
|---|---|---|
| 10 | 47 | 6.8 |
| 25 | 74 | 6.8 |
| 45 | 85 | 7.0 |
| 50 | 91 | 7.0 |
| 52 | 91 | 6.95 |
| 60 | 91 | 6.5 |

Figure 3:
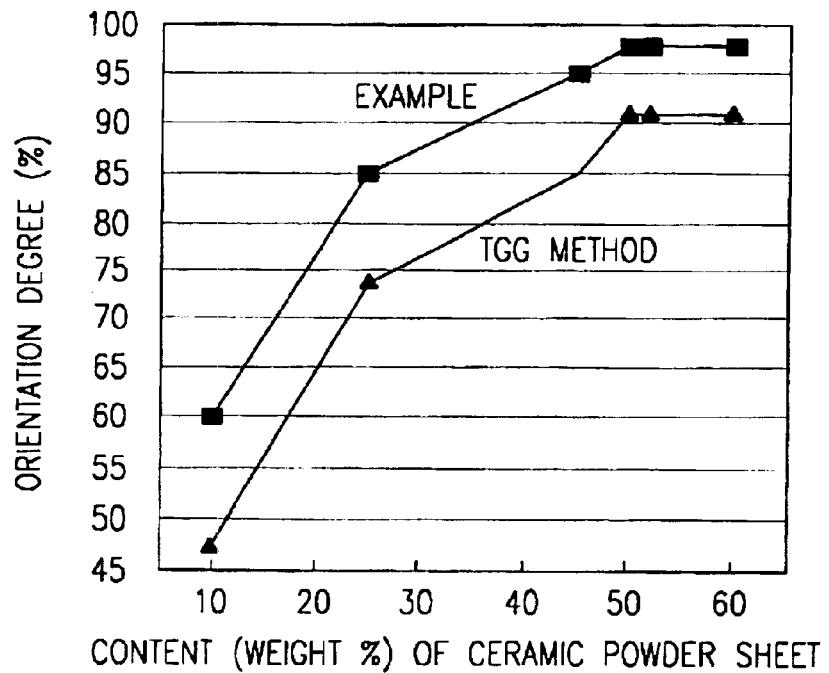
FIG. 3 is a graph showing relations between the contents of the sheet-shaped ceramic powder and the orientation degrees of the samples of the example and prepared by the TGG method.

FIG. 3 is a graph which illustrates the results of Tables 4 and 5 with respect to the relations between the content of the sheet-shaped ceramic powder and the orientation degrees of the samples.

As apparent from Tables 4 and 5 and the graph of FIG. 3, the orientation degrees of the samples of the Example were higher than those of the samples obtained by the TGC method. Table 4 and the graph of FIG. 3 show that when the content of the sheet-shaped ceramic powder was 25% by weight or higher in Example, the orientation degree was 85% or higher. Moreover, when the content of the sheet-shaped ceramic powder was 45% by weight or higher, the orientation degree was 95% or higher and when the content of the sheet-shaped ceramic powder was 50% by weight or higher, the orientation degree was 98% or higher.

Figure 4:
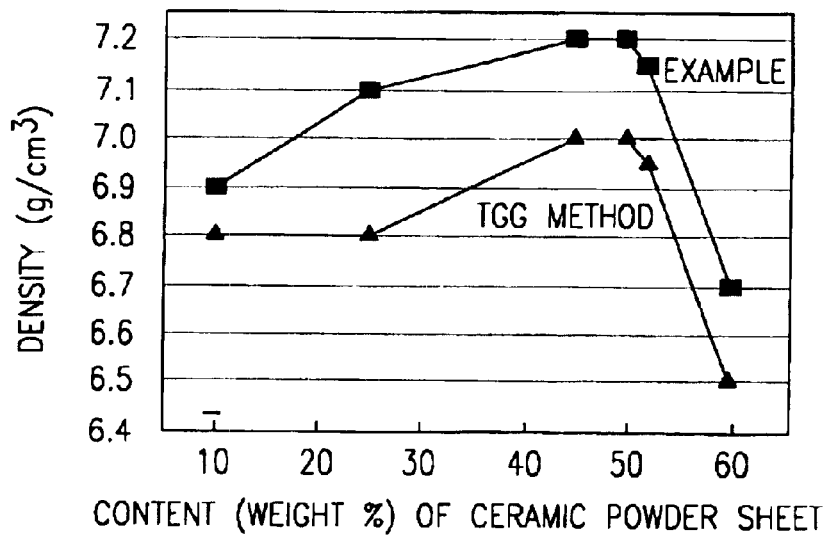
FIG. 4 is a graph showing relations between the contents of the sheet-shaped ceramic powder and the densities of the samples of the example and prepared by the TGG method.

FIG. 4 is a graph which illustrates the results of Tables 4 and 5 with respect to the relations between the content of the sheet-shaped ceramic powder and the densities of the samples.

As seen in Tables 4 and 5 and the graph of FIG. 4, the densities of the samples in Example were higher than those of the samples prepared by the TGG method. Table 4 and the graph of FIG. 4 show that when the content of the sheet-shaped ceramic powder in the samples of the example were in the range of about 25 to 52% by weight, the densities of the samples were large, that is, 7.1 g/cm$^3$ or higher. When the content of the sheet-shaped ceramic powder were in the range of about 45 to 50% by weight, the densities of the samples were still larger. Therefore, preferably, the content of the sheet-shaped ceramic powder is in the range of about 25 to 52% by weight based on 100% by weight of the powder of the sheet-shaped ceramic powder mixed with the calcined powder of the ceramic raw material, and more preferably, in the range of about 45 to 50% by weight.

The orientation degrees of the same samples as those of Example except that the aspect ratios of the sheet-shaped ceramic powder were 2, 4, 5 and 10 were measured. In this case, the content of the sheet-shaped ceramic powder was 50% by weight based on 100% by weight of the power of the sheet-shaped ceramic powder mixed with the calcined powder of the ceramic raw material, and the pressing thickness reduction ratios of the samples were 0.5. Table 6 shows the results.

TABLE 6

| aspect ratio | orientation degree (%) |
| --- | --- |
| 2 | 70 |
| 4 | 91 |
| 5 | 98 |
| 10 | 98 |

Using the TGC method, samples which were the same as those just shown except that the pressing thickness reduction ratios were 1.0 were prepared. The orientation degrees of the samples were measured. Table 7 shows the results.

TABLE 7

| aspect ratio | orientation degree (%) |
| --- | --- |
| 2 | 62 |
| 4 | 83 |
| 5 | 91 |
| 10 | 91 |

Figure 5:
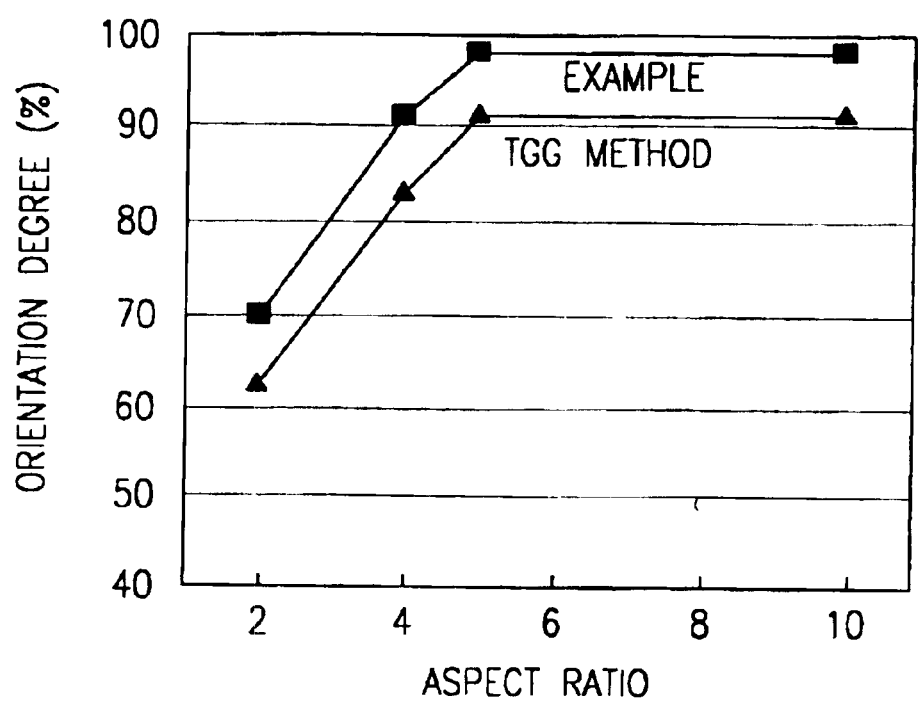
FIG. 5 is a graph showing relations between the aspect ratios and the orientation degrees of the samples of the example and prepared by the TGG method.

FIG. 5 is a graph which illustrates the results of Tables 6 and 7 with respect to the relations between the aspect ratios of the sheet-shaped ceramic powder and the orientation degrees of the samples.

As shown in Tables 6 and 7 and the graph of FIG. 5, the orientation degrees of the samples of Example were higher than those of the samples prepared by the TGG method. Furthermore, as seen in Table 6 and the graph of FIG. 5, when the aspect ratio of the sheet-shaped ceramic powder was about 4 or higher, the orientation degree was 91% or higher. When the aspect ratio was about 5 or higher, the orientation degree was 98% or higher. When the aspect ratio was about 10 or higher, the density of the ceramic was decreased. Accordingly, preferably, the aspect ratio of the sheet-shaped ceramic powder is in the range of about 4 to 10, and more preferably, in the range of about 5 to 10.

In the above-described example, a sheet-shaped ceramic powder is used in the mixed powder. According to the present invention, however, ceramic crystal grains having another shape-anisotropy may be used instead of the sheet-shaped ceramic powder.

Moreover, a calcined powder of the ceramic raw material is used in the mixed powder in the above-described Example. According to the present invention, a powder of the ceramic raw material may be used instead of the calcined powder of the ceramic raw material. Furthermore, the powder of the ceramic raw material may be used together with the calcined powder of the ceramic raw material.

In the above-described Example, a piezoelectric material is used. However, the type of ceramic according to the present invention is not restricted to such a material.

Moreover, the product is formed by the doctor blade method in the above-described Example. According to the present invention, the product may be formed by extrusion, anisotropically pressing, rolling, or the like.

According to the present invention, an ordinary baking furnace can be used for the firing. When the materials being fired are the same, an oriented ceramic having a higher orientation degree than that produced by the TGG method can be produced and the orientation degree can be substantially equal to that of an oriented ceramic produced by the hot forging method can be produced.

Furthermore, according to the present invention, an oriented ceramic having a higher orientation degree and a higher sintering density than that produced by the TGG method can be produced.

What is claimed is:

1. A method of producing a ceramic comprising:

preparing a ceramic slurry comprising a powder of ceramic crystal grains having a shape-anisotropy mixed with a ceramic raw material powder or a calcined ceramic raw material powder, or both;

forming the ceramic slurry to produce a sheet product;

uniaxially pressing the sheet product so that the length of the product in the direction parallel to the pressing axis is decreased compared to that before the pressing, and the area of a plane perpendicular to the pressing axis of the product is increased compared to that before the pressing, whereby an oriented formed product is produced; and sintering the oriented formed product, wherein the ceramic crystal grains having a shape-anisotropy have a layered perovskite crystal structure.

2. A method of producing a ceramic according to claim 1, wherein the powder mixture is of ceramic crystal grains having a shape-anisotropy mixed with a ceramic raw material powder.

3. A method of producing a ceramic according to claim 1, wherein the powder mixture is of ceramic crystal grains having a shape-anisotropy mixed with a calcined ceramic raw material powder.

4. A method of producing a ceramic according to claim 1, wherein the powder mixture is of ceramic crystal grains having a shape-anisotropy mixed with a calcined ceramic raw material powder and a ceramic raw material powder.

5. A method of producing a ceramic according to claim 1, wherein the pressing is such that the length of the oriented formed product in the direction parallel to the pressing axis is decreased up to about half of the length of the product before pressing.

6. A method of producing a ceramic according to claim 5, wherein the amount of the ceramic crystal grains having a shape-anisotropy are flat, have the aspect ratio is in the range of about 5 to 10 and are in the range of about 45 to 50% by weight based on 100% by weight of the mixed powder.

7. A method of producing a ceramic comprising:

preparing a ceramic slurry comprising a powder of ceramic crystal grains having a shape-anisotropy mixed with a ceramic raw material powder or a calcined ceramic raw material powder, or both;

forming the ceramic slurry to produce a sheet product;

uniaxially pressing the sheet product so that the length of the product in the direction parallel to the pressing axis is decreased compared to that before the pressing, and the area of a plane perpendicular to the pressing axis of the product is increased compared to that before the pressing, whereby an oriented formed product is produced; and sintering the oriented formed product, wherein the pressing is such that the length of the oriented formed product in the direction parallel to the pressing axis is decreased up to about half of the length of the product before pressing, wherein the amount of the ceramic crystal grains having a shape-anisotropy are in the range of about 25 to 52% by weight based on 100% by weight of the mixed powder, wherein the ceramic crystal grains having a shape-anisotropy are flat, and the aspect ratio is in the range of about 5 to 10, wherein the amount of the ceramic crystal grains having a shape-anisotropy are in the range of about 45 to 50% by weight based on 100% by weight of the mixed powder, and wherein the ceramic crystal grains having a shape-anisotropy have a layered perovskite crystal structure.

8. A method of producing a ceramic according to claim 7, wherein the powder mixture is of ceramic crystal grains having a shape-anisotropy mixed with a ceramic raw material powder.

9. A method of producing a ceramic according to claim 7, wherein the powder mixture is of ceramic crystal grains having a shape-anisotropy mixed with a calcined ceramic raw material powder.

10. A method of producing a ceramic according to claim 7, wherein the powder mixture is of ceramic crystal grains having a shape-anisotropy mixed with a calcined ceramic raw material powder and a ceramic raw material powder.

* * * * *